United States Patent
Li et al.

(10) Patent No.: US 12,158,789 B1
(45) Date of Patent: Dec. 3, 2024

(54) METHOD FOR CONTROLLING TOTAL POWER CONSUMPTION OF SYSTEM BY SETTING CONTROLLER PARAMETERS BASED ON PHASES

(71) Applicants: INVENTEC (PUDONG) TECHNOLOGY CORPORATION, Shanghai (CN); INVENTEC CORPORATION, Taipei (TW)

(72) Inventors: Biao Li, Shanghai (CN); Lian-Fei Zhang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 19 days.

(21) Appl. No.: 18/220,285

(22) Filed: Jul. 11, 2023

(30) Foreign Application Priority Data

Jun. 1, 2023 (CN) .......................... 202310644748.4

(51) Int. Cl.
*G06F 1/32* (2019.01)
*G06F 1/26* (2006.01)
*G06F 1/3206* (2019.01)

(52) U.S. Cl.
CPC .................................. *G06F 1/3206* (2013.01)

(58) Field of Classification Search
CPC ......... G06F 1/26; G06F 1/3203; G06F 1/3206
See application file for complete search history.

(56) References Cited

U.S. PATENT DOCUMENTS

| 5,718,373 | A  | * | 2/1998 | Kim ..................... F01P 7/048 236/78 D |
| 9,970,347 | B2 | * | 5/2018 | Hoff .................... F02B 29/0475 |
| 2005/0081542 | A1 | * | 4/2005 | Braun ................... F01P 7/048 62/186 |
| 2016/0115856 | A1 | * | 4/2016 | Ge ......................... F01P 7/04 415/16 |

\* cited by examiner

*Primary Examiner* — Nitin C Patel

(57) ABSTRACT

A method for controlling total power consumption of system by setting controller parameters based on phases is provided, which is applied to a system at least including heat-generating element, fan, and controller. The method includes: setting the controller with heating control parameter and cooling control parameter; reading, by the controller, current temperature and temperature at a previous moment of the heat-generating element; and comparing, by the controller, current temperature with temperature at the previous moment to determine whether the heat-generating element is in heating phase or in cooling phase; in case of the heating phase, the controller provides feedback control to the fan based on the heating control parameter; in case of the cooling phase, the controller provides feedback control to the fan based on the cooling control parameter; thereby controlling the total power consumption of the system.

9 Claims, 2 Drawing Sheets

METHOD FOR CONTROLLING TOTAL POWER CONSUMPTION OF SYSTEM BY SETTING CONTROLLER PARAMETERS BASED ON PHASES

This application claims priority under 35 U.S.C. § 119 to Chinese Patent Application No. 202310644748.4, filed on Jun. 1, 2023, the entire content of which is incorporated herein in its entirety.

TECHNICAL FIELD

The present application relates to a method for controlling total power consumption of a system by setting controller parameters based on phases, and more particularly relates to a method, which has a heating control parameter and a cooling control parameter, for controlling total power consumption of the system.

BACKGROUND

In general, in the existing technologies, an overall server system needs to undergo a test on temperature and total power consumption of the overall system and so on under designated specific environment and condition. The overall server system is configured internally to include at least the following devices: a central processing unit (CPU), a memory, a hard disk, a network card, a graphic processing unit (GPU), and the like. In addition, in one scenario of actual test, it is required that, under an environmental temperature of 25° C. for the overall system, instantaneous maximum total power consumption of the overall system is measured to be no more than 900 W.

For a condition under which an environmental temperature is 25° C., a setpoint (SP in abbreviation) temperature Tsp for safe operation of the graphic processing unit is 72° C., and a loading pressure is continuously increased from 10% to 100%, with one set of result obtained by performing a test for every 10% increment in the loading pressure. Duration of a single test is 20 minutes. Test results show that total power consumption of the overall system in a stable phase is less than 870 W. However, there are multiple peaks in the power consumption of the overall system, and a maximum transient power consumption pertaining to these peaks reaches 930 W, which is significantly higher than the total power consumption 900 W set for the overall system in the stable phase. In order to satisfy the requirement that the transient total power consumption does not exceed 900 W, it is necessary to eliminate these power consumption peaks of the overall system.

SUMMARY

In view of the prior art, total power consumption of an overall system may generate multiple power consumption peaks, which is unstable. Therefore, obtaining relatively stable total power consumption of the overall system has become an urgent issue needs to be resolved.

To resolve the problem of the prior art, an essential technical measure adopted by the present disclosure is to provide a method for controlling total power consumption of system by setting controller parameters based on phases, which is applied to a system including at least one heat-generating element, one fan, and one controller. The method includes: setting the controller with a heating control parameter and a cooling control parameter; reading, by the controller, a current temperature and a temperature at a previous moment of the heat-generating element; and comparing, by the controller, the current temperature with the temperature at a previous moment to determine whether the heat-generating element is in a heating phase or in a cooling phase; wherein, if it is determined that the heat-generating element is in the heating phase, the controller provides feedback control to the fan based on the heating control parameter; if it is determined that the heat-generating element is in the cooling phase, the controller provides feedback control to the fan based on the cooling control parameter in order to control the total power consumption of the system.

According to an auxiliary technical measure derived from the above-mentioned essential technical measure, a step is further included: determining, by the controller, whether a PID speed control strategy needs to be launched.

According to an auxiliary technical measure derived from the above-mentioned essential technical measure, the heating control parameter is larger than the cooling control parameter.

In view of the above, since the method for controlling total power consumption of system by setting controller parameters based on phases is a method, which uses different heating control parameter and cooling control parameter, for controlling total power consumption of the system, the present disclosure is able to effectively achieve relatively stable total power consumption of the system.

Specific embodiments adopted by the present disclosure are further illustrated in accordance with the following embodiments and accompanying drawings.

Figure 1:
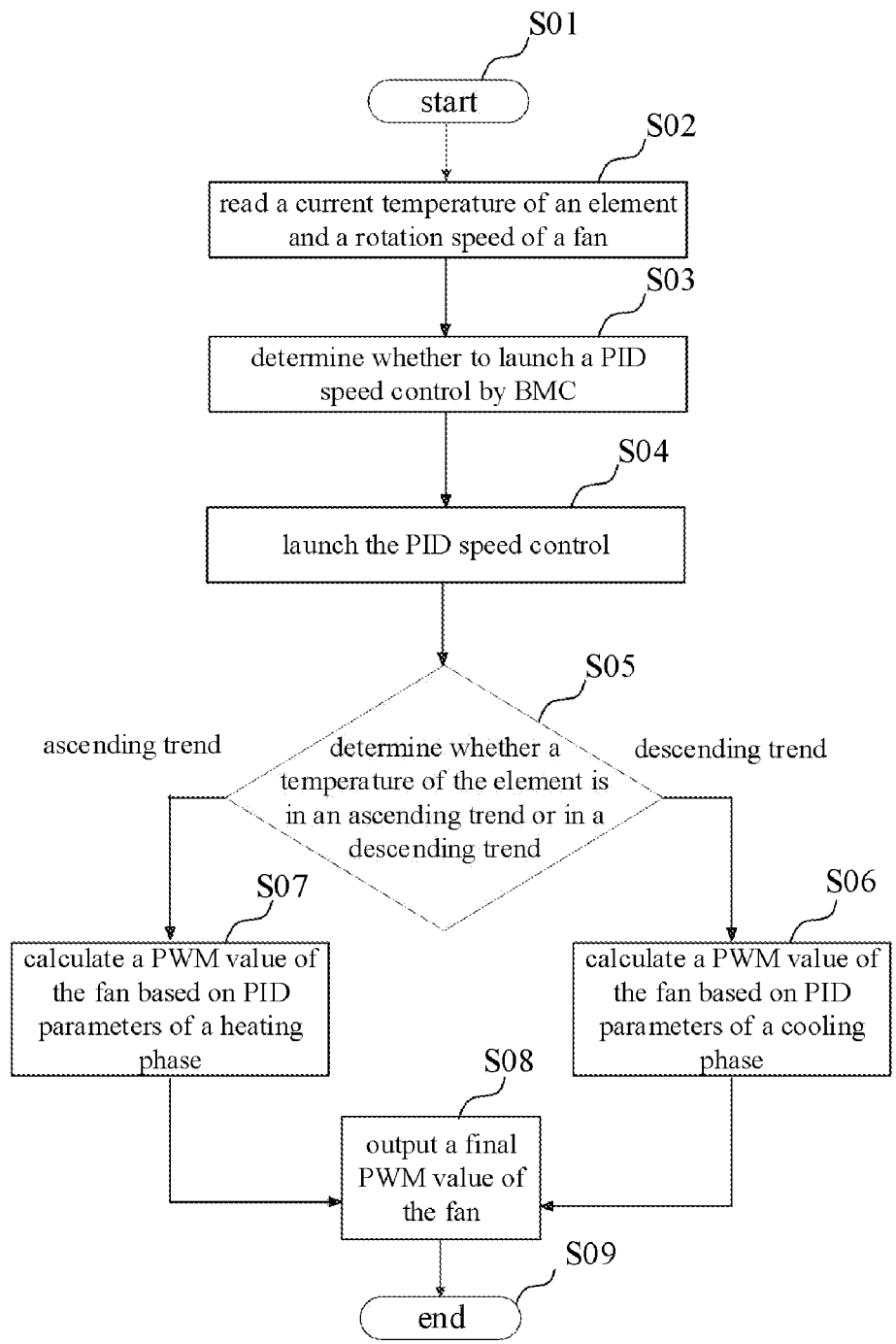
FIG. 1 shows a flow chart of a method for controlling total power consumption of a system by setting controller parameters based on phases according to a preferred embodiment of the present disclosure.

descriptions of reference numerals are as follows:
10: element;
20: baseboard management controller;
21: input unit;
22: storage unit;
23: calculation unit;
24: output unit;
30: complex programmable logic device;
40: fan;
S01~S09: step

DETAILED DESCRIPTION OF THE EMBODIMENTS

Figure 2:
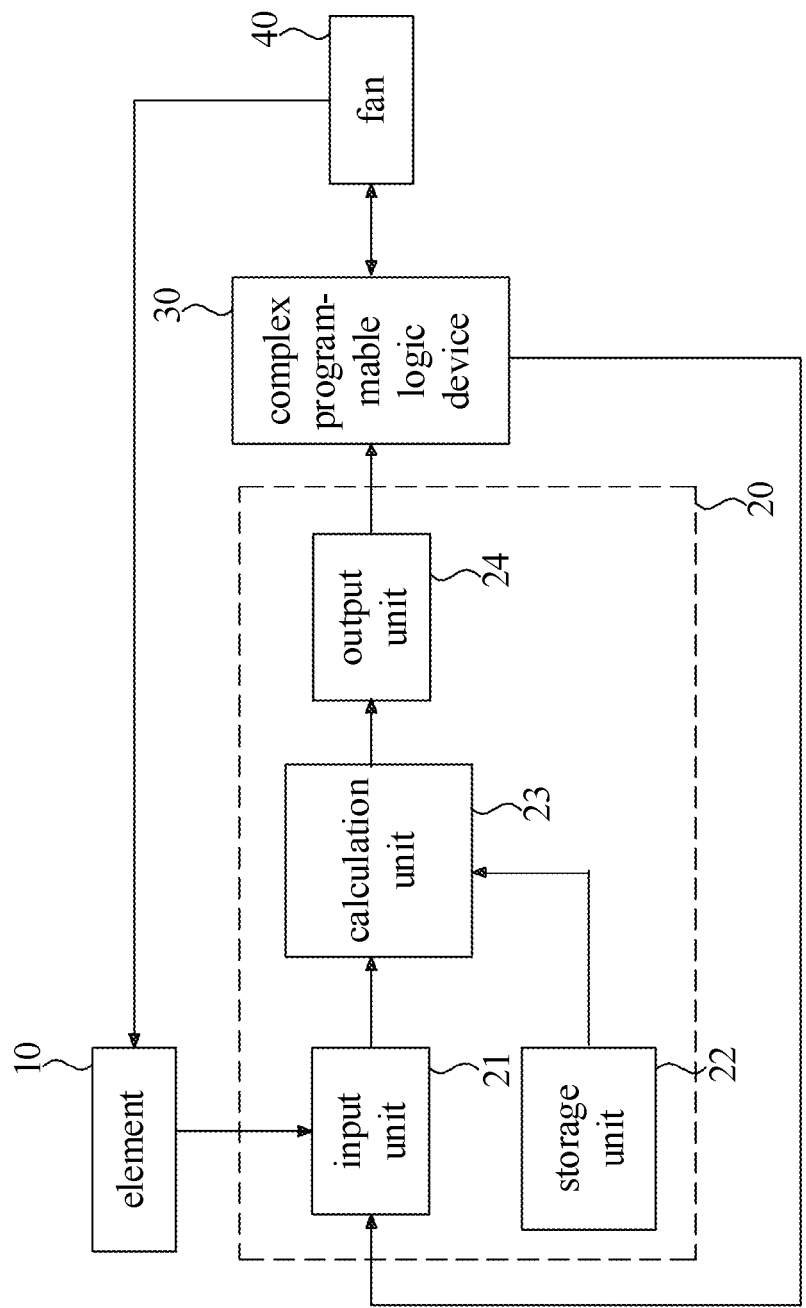
FIG. 2 shows a schematic diagram of a structure for implementing a method for controlling total power consumption of a system by setting controller parameters based on phases according to a preferred embodiment of the present disclosure.

References may be made to FIG. 1 and FIG. 2. FIG. 1 shows a flow chart of a method for controlling total power consumption of a system by setting controller parameters based on phases provided by a preferred embodiment of the present disclosure. FIG. 2 shows a schematic diagram of a structure for implementing a method for controlling total power consumption of a system by setting controller parameters based on phases provided by a preferred embodiment of the present disclosure.

As shown in FIG. 1, a method for controlling total power consumption of a system by setting controller parameters based on phases is disclosed by the present disclosure, such method is applied to a system at least including a heat-generating element, a fan 40, and a controller. The controller may be, for example, a baseboard management controller (BMC) 20, which contains a Proportion Integration Differentiation (PID) controller, or a PID control value is stored in a storage unit 22 of the BMC 20 and is for calculation by a calculation unit 23. The heat-generating element may be, for example, an element 10 shown in FIG. 2, which generally refers to an element that may generates heat, such as a central processing unit (CPU) or a graphic processing unit (GPU).

The method of the present disclosure includes: first, starting a test process of an experiment and setting a controller with a heating control parameter and a cooling control parameter (Step S01); then, reading a current temperature of element 10, a temperature at a previous moment of element 10 and a rotation speed of fan 40 by a controller (Step S02); next, determining, by the controller, whether to launch a PID speed control strategy (Step S03); if determination result is positive, launching the PID speed control strategy (Step S04).

The aforementioned PID speed control, which stands for "proportional, integral, derivative control", has PID control values that include a proportional coefficient Kp, an integral coefficient Ki, and a derivative coefficient Kd. This is a commonly used control strategy for fan 40, which is usually activated during a loading pressurization test, with an objective to quickly adjust an appropriate rotation speed of fan 40 to meet a temperature control requirement of element 10.

Further, the controller compares the current temperature with the temperature at the previous moment to determine whether temperature of element 10 is in an ascending trend or in a descending trend, that is, whether element 10 is in a heating phase or in a cooling phase (Step S05). It should be particularly noted that a way for determining whether the temperature of element 10 is in an ascending or in a descending trend may include, for example, determining whether the temperature is in an ascending trend or in a descending trend based on values of the current temperature and the temperature at the previous moment, or determining whether the temperature is in an ascending trend or a descending trend based on whether a difference between values of the current temperature and the temperature at the previous moment is greater than a certain threshold; other alternatives to determine temperature trend may also be applied to the present disclosure.

If it is determined that the temperature of element 10 is in a descending trend, that is, element 10 is in a cooling phase, the controller calculates a pulse-width modulation (PWM in abbreviation) value of fan 40 based on a cooling control parameter, which is, for example, one kind of PID control value (Step S06), and outputs the PWM value as a final current PWM value PWM(i) of fan 40 (Step S08). Thus, a feedback control is provided to fan 40 by the controller to control the total power consumption of the system.

If it is determined that the temperature of element 10 is in an ascending trend, that is, element 10 is in a heating phase, the controller calculates a PWM value of fan 40 based on a heating control parameter, which is, for example, another kind of PID control value (Step S07), and outputs the PWM value as a final current PWM value PWM(i) of fan 40 (Step S08). Thus, a feedback control is provided to fan 40 by the controller to control the total power consumption of the system. The experiment is ended (Step S09).

It should be particularly noted that description of a way for calculating the PWM value of fan 40 using the PID speed control strategy by the controller is as follows. The controller obtains a current PWM value PWM(i) based on a PWM value at a previous moment PWM(i−1) and a PWM difference ΔPWM(i) of the fan 40, that is, PWM(i) is calculated according to the following formula: PWM(i)=PWM(i−1)+ΔPWM(i). A specific way of calculating the PWM difference ΔPWM(i) of fan 40 is accomplished according to the following formula:

$$\Delta PWM(i)=Kp^*[e(i)-e(i-1)]+Ki^*e(i)+Kd^*[T(i)-2^*T(i-1)+T(i-2)], \text{ where } e(i)=T(i)-Tsp;$$

T (i) is a temperature of element 10 at an i-th moment, that is, a temperature at a current moment; Tsp is a setpoint temperature for safe operation of element 10; and Kp, Ki, and Kd are PID control values stored in baseboard management controller 20, which are a proportional coefficient, an integral coefficient, and a differential coefficient respectively. When the element is in the cooling phase, corresponding PID values are substituted as cooling control parameters into calculation to obtain the current PWM value PWM(i). When the element is in the heating phase, corresponding PID values are substituted as heating control parameters into calculation to obtain the current PWM value PWM(i).

Description of related hardware is presented as follows, and reference may be made to FIG. 2, which is a schematic diagram of a structure for implementing a method for controlling total power consumption of a system by setting controller parameters based on phases provided by a preferred embodiment of the present disclosure. The above-mentioned PID speed control strategy in the present disclosure is programmed into the baseboard management controller 20, and a specific control logic is as follows. The baseboard management controller 20 communicates with element 10 and a complex programmable logic device 30 (CPLD in abbreviation). An input unit 21 of the baseboard management controller 20 reads a temperature of element 10, a rotation speed of fan 40, and other information. A cooling strategy (including a PID speed control strategy) stored in a storage unit 22 of the baseboard management controller 20 along with the above-mentioned information read by the input unit 21 are transmitted to a calculation unit 23 of the baseboard management controller 20. The calculation unit 23 determines whether the overall system platform is in a normal working state to decide whether to launch a PID speed control and a way of calculation in case of launching PID speed control, and so forth. A calculated PWM difference value ΔPWM(i) of fan 40 is further transmitted as a fan control instruction to CPLD 30 by an output unit 24 of the baseboard management controller 20. The CPLD 30 further transmits the fan control instruction, which is transmitted by the baseboard management controller 20, to the fan 40. The fan 40 may determine whether and how to adjust its speed according to the fan control instruction sent by the CPLD 30, eventually completing a control of the fan 40 by the baseboard management controller 20. Additionally, the fan 40 transmits a fan signal, which includes information such as rotation speed, to the CPLD 30, and the CPLD 30 transmits its feedback to the input unit 21. Therefore, change in the rotation speed of fan 40 may cause a change in the temperature of element 10, which further counter reacts on the control by the baseboard management controller 20, achieving a bidirectional interaction between the temperature of element 10 and the rotation speed of fan 40.

For the test of the experiment, a specific loading pressure testing software is used to conduct the test of the experiment, which is particularly used for a graphic processing unit of the overall server system. During the experiment, power consumption of the graphic processing unit is momentarily halved and then quickly restored to full power, i.e., the power consumption is rapidly decreased and then rapidly increased, resulting in a rapid decrease followed by a rapid increase in temperature of the graphics processing unit. However, since both a heat dissipation risk point and a control point of fan 40 under a pressurized loading condition are in the graphic processing unit, that is, the graphic processing unit under the pressurized condition is the only element determining a rotation speed of fan 40, the graphic processing unit causes drastic fluctuations in the rotation speed of fan 40 at the end and beginning of each cycle.

Since the temperature of the graphic processing unit is closely related to the power consumption of the graphic processing unit, and the temperature of the graphic processing unit needs to be read before the rotation speed of fan 40 is adjusted, there is a certain delay in a response of the rotation speed of fan 40 to the power consumption of the graphic processing unit. This delay inevitably results in excessive adjustment of the rotation speed of fan 40, causing peaks in both the rotation speed of fan 40 and the power consumption, leading to peaks in the total power consumption of the system.

Based on the above-mentioned analysis, in order to reduce an impact of the graphic processing unit on the rotation speed of fan 40 during a process from an end to a restart of each cycle such that a goal of controlling the total power consumption of the overall system may be achieved, the following PID control strategy is proposed by the present disclosure: different parameters of PID control values are set for the heating phase and the cooling phase in the controller. Specifically, relatively large parameters of PID control values are set when the graphic processing unit is in the heating phase in order to quickly respond to changes in the temperature of the graphic processing unit. Relatively small parameters of PID control values are set when the graphic processing unit is in the cooling phase in order to decrease a degree of reduction in the rotation speed of fan 40. For example, when the graphics processing unit is in the heating phase, parameters of PID control values corresponding to the heating control parameters are 3, 0.5, and 0.1 respectively; and when the graphic processing unit is in the cooling phase, parameters of PID control values corresponding to the cooling control parameters are 1, 0.2, and 0.1 respectively. It is apparent that the heating control parameters are greater than the cooling control parameters.

More specifically, due to setting different parameters of PID control values for the heating phase and the cooling phase, the heating control parameters are larger and the cooling control parameters are smaller, during the heating phase, temperature of the graphic processing unit rises more rapidly, and a larger PWM difference $\Delta PWM(i)$ may be generated by using parameters of PID control values corresponding to the larger heating control parameters, facilitating increasing the rotation speed of the fan 40 rapidly, such that the temperature of the graphic processing unit may be reduced. During the cooling phase, a smaller PWM difference $\Delta PWM(i)$ may be calculated by using parameters of PID control values corresponding to the smaller cooling control parameters such that an amount of reduction in the rotation speed of fan 40 is smaller at an end of the cycle. Although the temperature of the graphic processing unit rises when the cycle restarts, the rotation speed of fan 40 is relatively large, which slows down a rise in temperature of the graphic processing unit and reduces an overshoot of fan 40 after the temperature of the graphic processing unit reaches a maximum point, thereby achieving a goal of reducing power consumption peaks of fan 40 and total power consumption peaks of the system.

Main purpose of the present disclosure is to decrease a degree of reduction in the rotation speed of fan 40 when the graphic processing unit is in the cooling phase. Parameters of PID control values in the cooling phase are smaller, which allow the degree of reduction in the rotation speed of fan 40 to be smaller when the graphic processing unit is in the cooling phase, thereby improving a minimum rotation speed of fan 40 during a phase from an end of the cycle to a restart of the cycle of the graphic processing unit. Although the power consumption and the temperature rise from the end of the cycle to the restart of the cycle, the rotation speed of fan 40 is still relatively large. Therefore, a demand to increase the rotation speed of fan 40 is decreased, leading to a reduction in power consumption of fan 40 and total power consumption of the system.

A final result of the experiment shows that power consumption of the graphic processing unit during a cycle first decreases rapidly and then increases rapidly, causing temperature of the graphic processing unit, rotation speed of fan 40, power consumption of fan 40, and total power consumption of the overall system to decrease rapidly and then to increase rapidly. Therefore, an effective PID control strategy is proposed by setting two sets of different parameters including heating control parameters and cooling control parameters to reduce the maximum rotation speed of fan 40 and the power consumption of fan 40, thereby achieving a goal of reducing the maximum transient total power consumption of the overall system and meeting the requirements of avoiding power consumption peaks.

It should be particularly noted that a key point of the above-mentioned strategy is the control strategy itself, and the exemplified content of the heating control parameters and the cooling control parameters is not unique, and further adjustment and optimization may be made according to changes in requirements. The key point is to achieve a goal of reducing a maximum rotation speed of fan 40 and a maximum total power consumption of the overall system through the strategy of the present disclosure.

In addition, it should be noted that although the above-mentioned strategy is based on an experiment result obtained from a pressure testing software which conducts actual loading pressurization on the graphic processing unit, the strategy can still be applied to other configurations of overall system and system platform that have severe fluctuations in power consumption and strict requirements for total power consumption of the overall system.

After conducting actual testing on the graphic processing unit using a loading pressure testing software, it is found that power consumption of the graphic processing unit first decreases rapidly and then increases rapidly, causing quick decreasing and then quick increasing of the temperature of the graphic processing unit, the rotation speed of fan 40, the power consumption of fan 40, and the total power consumption of the overall system. Therefore, an effective control strategy is provided by the present disclosure, which has the following advantages.

1. Rotation speed of fan 40 can be adjusted based on a temperature of element 10, such as a graphic processing unit, with features including fast response speed, high control accuracy, and an ability to achieve stable control quickly.

2. Different parameters of PID control values are adopted for a heating phase and a cooling phase. By reducing the rotation speed of fan 40 during the cooling phase, the maximum rotation speed of fan 40 and total power consumption of the system during the heating phase are effectively reduced.

3. A power consumption curve of the overall system is relatively flat, and does not contain drastic power consumption peaks, which leads to a small impact on power supply equipment and is conducive to extending life of the equipment.

4. The control strategy only requires some adjustments to be made in speed control instruction of the baseboard management controller 20, with low alteration difficulty and low alteration costs.

In view of the above, since the method for controlling total power consumption of system by setting controller parameters based on phases provided by the present disclosure is a method for controlling total power consumption of the system by using heating control parameters and cooling control parameters which are different from each other, the present disclosure can effectively achieve a more stable total power consumption of the system.

The above-mentioned preferred embodiments are illustrated in the hope that features and spirits of the present disclosure are described more clearly, yet the scope of the present disclosure shall not be limited by using the above-mentioned preferred embodiments being disclosed. On the contrary, the objective is to cover various alternations and equivalent arrangements within the intended scope of the present disclosure.

What is claimed is:

1. A method for controlling total power consumption of a system by setting controller parameters based on phases, which is applied to a system at least comprising a heat-generating element, a fan, and a controller, wherein the method comprises:

setting the controller with a heating control parameter and a cooling control parameter;

reading, by the controller, a current temperature and a temperature at a previous moment of the heat-generating element; and comparing, by the controller, the current temperature with the temperature at the previous moment to determine whether the heat-generating element is in a heating phase or in a cooling phase; wherein, if it is determined that the heat-generating element is in the heating phase, the controller provides feedback control to the fan based on the heating control parameter, in order to control the total power consumption of the system; if it is determined that the heat-generating element is in the cooling phase, the controller provides feedback control to the fan based on the cooling control parameter, in order to control the total power consumption of the system.

2. The method of claim 1, wherein the heat-generating element is a graphic processing unit.

3. The method of claim 1, wherein the controller is a baseboard management controller.

4. The method of claim 1, further comprising: determining, by the controller, whether to launch a PID speed control strategy.

5. The method of claim 4, wherein, the heating control parameter and the cooling control parameter owned by the controller each includes a proportional coefficient, an integral coefficient, and a differential coefficient.

6. The method of claim 5, wherein the proportional coefficient, the integral coefficient and the differential coefficient of the heating control parameter are 3, 0.5 and 0.1 respectively.

7. The method of claim 5, wherein the proportional coefficient, the integral coefficient and the differential coefficient of the cooling control parameter are 1, 0.2 and 0.1 respectively.

8. The method of claim 1, wherein the heating control parameter is larger than the cooling control parameter.

9. The method of claim 1, wherein the providing, by the controller, feedback control to the fan based on the heating control parameter and providing, by the controller, feedback control to the fan based on the heating control parameter comprises:

calculating, by the controller, a current pulse-width modulation value of the fan and outputting the current pulse-width modulation value.

\* \* \* \* \*